United States Patent [19]

Chadima, Jr. et al.

[11] Patent Number: 4,953,113

[45] Date of Patent: Aug. 28, 1990

[54] HAND-HELD COMPUTERIZED DATA COLLECTION TERMINAL WITH INDENTED GRIPCONFORMING CONFIGURATION

[76] Inventors: George E. Chadima, Jr., 3624 Skylark La. SE.; Darald R. Schultz, 3861 Trailridge Rd., SE., both of Cedar Rapids, Iowa 52403

[21] Appl. No.: 406,822

[22] Filed: Sep. 7, 1989

Related U.S. Application Data

[63] Continuation of Ser. No. 104,653, Oct. 2, 1987, abandoned.

[51] Int. Cl.$^5$ .............................................. G06F 1/00
[52] U.S. Cl. .................................... 364/708; 235/1 D
[58] Field of Search ............... 364/708, 403; 235/1 D; 401/8; 16/110 R

[56] References Cited

U.S. PATENT DOCUMENTS

| | | | |
|---|---|---|---|
| 230,859 | 3/1974 | Kurosu | D26/5 C |
| 295,411 | 4/1988 | Cho et al. | D14/100 |
| 299,234 | 1/1989 | Kajita | D14/100 |
| 3,665,164 | 5/1972 | Beveridge et al. | 364/403 |
| 4,002,892 | 1/1977 | Zielinski | 364/708 |
| 4,017,725 | 4/1977 | Roen | 364/708 |
| 4,020,527 | 5/1977 | O'Neill | 235/1 D |
| 4,165,554 | 8/1979 | Faget | 235/1 D |
| 4,506,344 | 3/1985 | Hubbard | 364/708 |
| 4,627,736 | 12/1986 | Komaki | 364/708 |

OTHER PUBLICATIONS

"1200 Portable FM Terminal Data Transceiver Network" brochure No. 585 NRD-LD, 1985 Norand Corp. 6 pages.

Primary Examiner—David H. Malzahn
Attorney, Agent, or Firm—Neuman, Williams, Anderson & Olson

[57] ABSTRACT

In a exemplary computerized FM Data Transceiver terminal, an antenna may extend longitudinally from one end and a battery drawer at an opposite (lower) end may receive a detachable bar code scanner module or the like for mechanized data input. In such computer terminals which are hand-held for relatively long time periods, e.g., during inventory data collection, use of the terminal is particularly facilitated by indenting the underside of the terminal intermediate its ends to form a hand grip configuration and by providing a strap spanning the indentation such that the fingers of one hand can be inserted between the hand grip and strap in a quick smooth motion without requiring as a separate motion the lifting of the strap to accommodate the fingers. These features coact to provide for an outstandingly comfortable and secure gripping of the terminal during use. Preferably any finger receiving clearance gap between grip and strap, the width of the strap, and the indented and rounded grip configuration are such as to allow a substantial relaxation of the grip at desired intervals durikng a work period to minimize hand muscle fatigue.

17 Claims, 3 Drawing Sheets

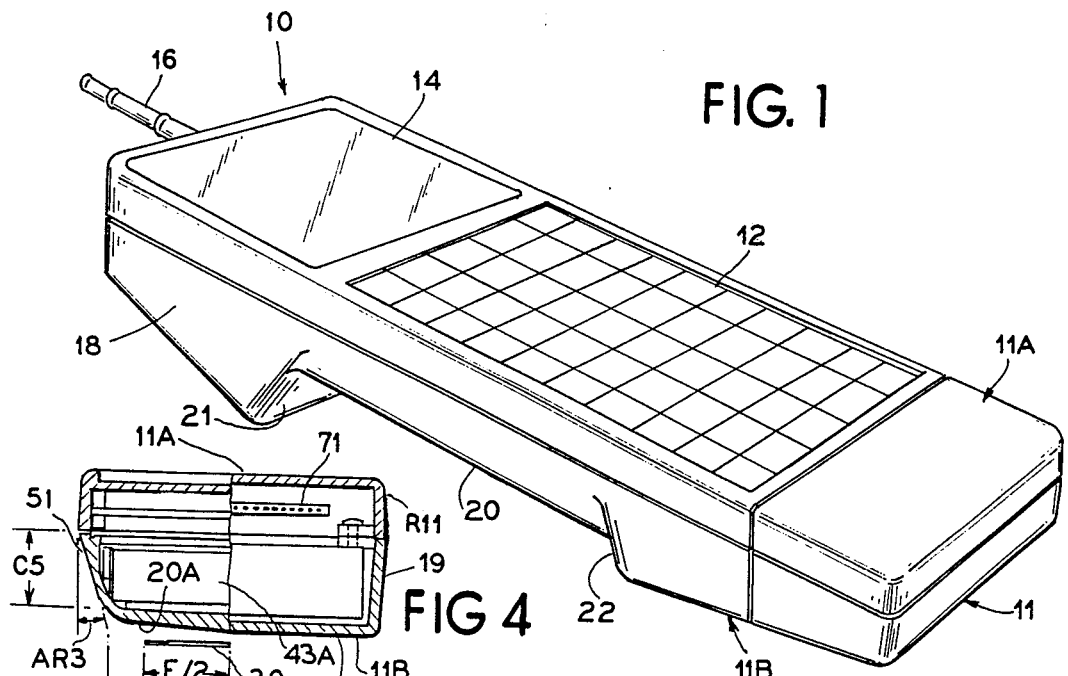
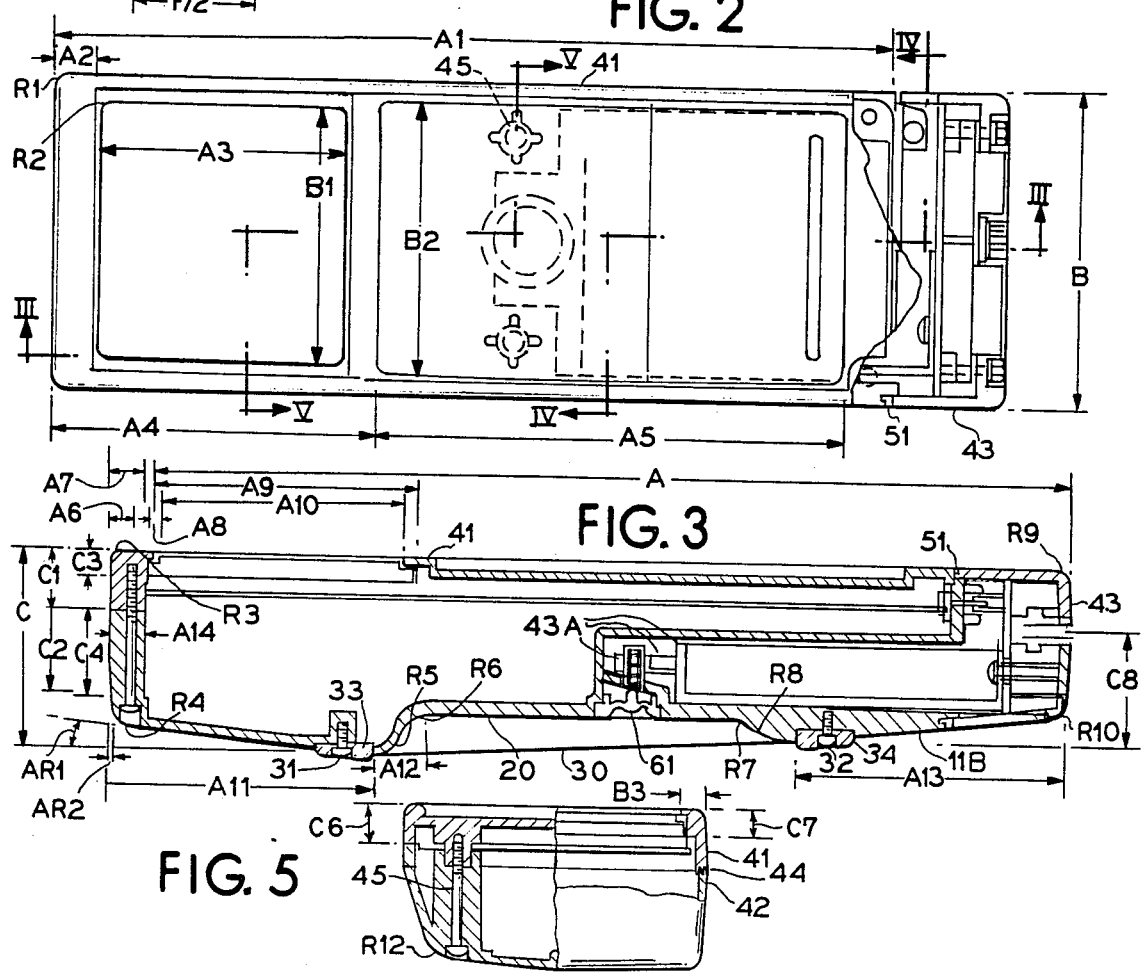

HAND-HELD COMPUTERIZED DATA COLLECTION TERMINAL WITH INDENTED GRIPCONFORMING CONFIGURATION

This is a continuation of application Ser. No. 104,653, filed Oct. 2, 1987, now abandoned.

BACKGROUND OF THE INVENTION

Hand-held computer terminals have proved to be of great value in a number of data collection environments. For example, a portable FM data transceiver terminal of the present assignee has found extensive use in maintaining inventory information. A brochure describing a commercial 1210 Portable Data Terminal of Norand Corporation, Cedar Rapids, Iowa, is entitled "1200 Portable FM Terminal Data Transceiver Network" and is marked copyright 1985, and bears a number 585NRD-LD, and comprises six pages. This brochure is incorporated herein by reference in its entirely. It is conceived that the highly successful commercial portable computer terminal can be further enhanced by making it more compact, lighter in weight and generally easier and more secure in handling during inventory and other demanding applications.

SUMMARY OF THE INVENTION

It is an object of the present invention to provide an improved hand-held computer terminal which is readily grasped by the user and which is held in a particularly secure and comfortable manner to facilitate its use over extended time periods.

Another object resides in the provision of an improved portable data collection terminal which is capable of real time on line communication with a stationary computer system via an RF link and which can be securely held by a user while allowing the user to periodically relax his grip on the unit throughout a working day for minimizing fatigue.

In a preferred embodiment a computer terminal of the hand-held type is contoured at an underside for particularly comfortable gripping in one hand. Most preferably a strap extends across a somewhat indented rounded hand grip region so that the user can sweep his hand quickly in a single smooth motion into a clearance gap between the grip region and the strap (without using his other hand to lift the strap away from the terminal). The strap preferably will retain the unit against the user's hand even when the user lowers his hand and substantially relaxes his grip on the terminal. In this way the user is allowed to periodically relax his hand without taking the time to place the unit in a secure location where it will be safe against falling or being knocked to the floor.

BRIEF DESCRIPTION OF THE DRAWINGS

FIG. 1 is a somewhat diagrammatic frontal perspective view showing a hand-held computer terminal in accordance with the present invention;

FIG. 2 is a plan view of the casing per se for a presently preferred terminal unit according to FIG. 1;

FIG. 3 is a longitudinal sectional view taken along the line III—III of FIG. 2;

FIG. 4 is a cross sectional view taken along the line IV—IV of FIG. 2;

FIG. 5 is a cross sectional view taken generally along the line V—V of FIG. 2;

DETAILED DESCRIPTION

Figure 6:
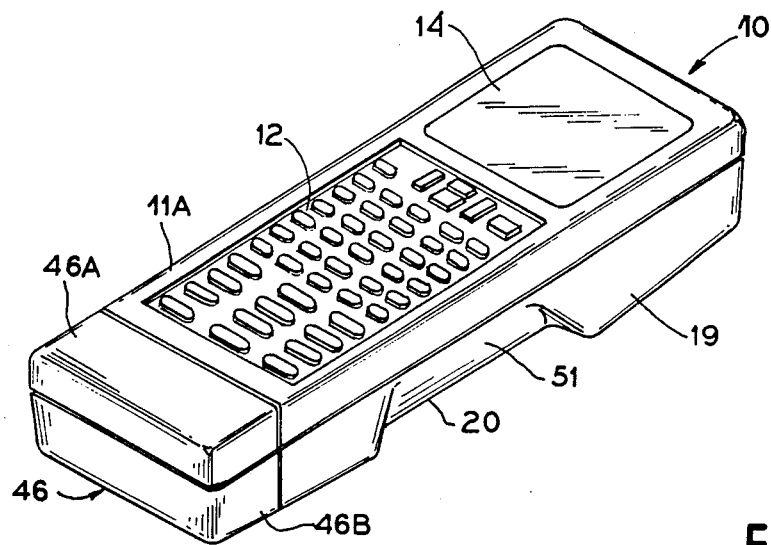
FIG. 6 is a perspective view generally similar to FIG. 1 but showing the right-hand side of the terminal unit.

FIG. 1 shows the general configuration of a hand-held computer terminal embodying the teachings of the present invention. FIG. 1 specifically shows an interactive, portable FM transceiver data terminal which may incorporate the circuitry of the 1210 commercial unit whose descriptive brochure is identified herein in the section headed "BACKGROUND OF THE INVENTION", and has been incorporated herein by reference. This incorporated brochure describes the unit as having an "elastic hand strap". The terminal 10 of FIG. 1 has a casing 11 with an upper or frontal side 11A including a manual data entry keyboard 12 and a display 14. The unit may include a stubby antenna 16, e.g., two inches in length, and projecting longitudinally from an end of the terminal casing. Optionally the casing may receive a whip antenna, e.g., six inches in length.

At its underside 11B, (which may comprises the bottom 17, FIG. 4, and lower side walls 18, FiG. 1, and 19, FIG. 4), casing 11 is provided with a grip-conforming configuration 20 having a longitudinal extent to receive the fingers of one hand in gripping relation thereto. The underside 11B is indented at 20, so that projecting shoulder portions 21 and 22 adjoin the grip-conforming region 20 and prevent slippage of the terminal in either longitudinal direction during gripping support thereof.

FIG. 2 shows a plan view of casing 11, and FIGS. 3, 4 and 5 show sectional views taken along the lines III—III, IV—IV and V—V of FIG. 2, respectively. FIG. 3 shows a strap 30 which is disposed at the underside 11B of the terminal casing and extends longitudinally between respective sets of fasteners 31 and 32. FIGS. 6 through 10 are respectively an exterior perspective view an exterior left side, bottom and end views of the terminal 10, FIG. 8 showing strap 30 in a plan view, with three fasteners in each of the sets 31 and 32, securing strap end pieces 33 and 34.

Letters A, B and C indicate overall dimensions of the hand-held terminal in FIGS. 2-5, while subordinate designations such as A1, B1 and C1 show component dimensions. Presently preferred values for these parameters are as follows (in inches):

A=10.25, B=3.312, C=2.06,
A1=9.00, A2=0.5, A1=2.63 (opening),
A4=3.50, A5=5.00

A6=0.250, A7=0.40, A8=0.090,
A9=2.82 (2.82×2.82 glass LCD)
A10=2.63
A11=2.86, A12=,0.685, A13=2.91, A14=0.386
B1=2.70 (opening), B2=2.875, B3=0.216 (FIG. 5)
C1=0.625, C2=0.876, C3=0.265, C4=1.015
C5=1.700 (FIG. 4), C6=0.395 (FIG. 5), C7=0.265 (FIG. 5)
C8=1.22 (FIG. 3)

Various radii and angles are indicated in FIGS. 2-5 (in inches and degree: respectively) as follows:
R1=0.187 (four places, FIG. 2)
R2=0.125 (typical, FIG. 2)
R3=0.125 (typical, FIG. 3)
R4=0.250 (FIG. 3)
R5=0.250 (FIG. 3), R6=0.500 (FIG. 3)
R7=0.500 (FIG. 3), R8=1.00 (FIG. 3)
R9=0.125 (FIG. 3), R10=0.125 (FIG. 3)
R11=0.125 (FIG. 4)
R12=0.375 (FIG. 5)
AR1=5 degrees (FIG. 3), AR2=3degrees (FIG. 3)
AR3=20 degrees (FIG. 4)

Figure 7:
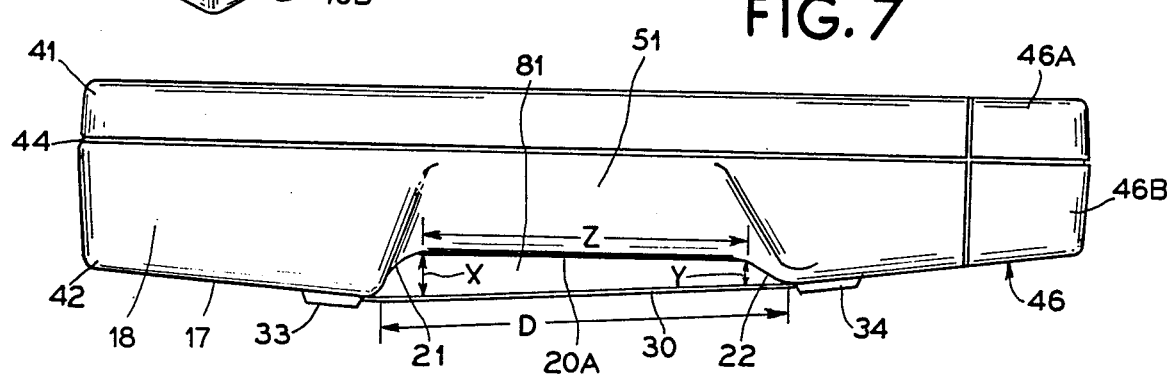
FIG. 7 is a side elevational view of the left exterior of the unit.
Figure 8:
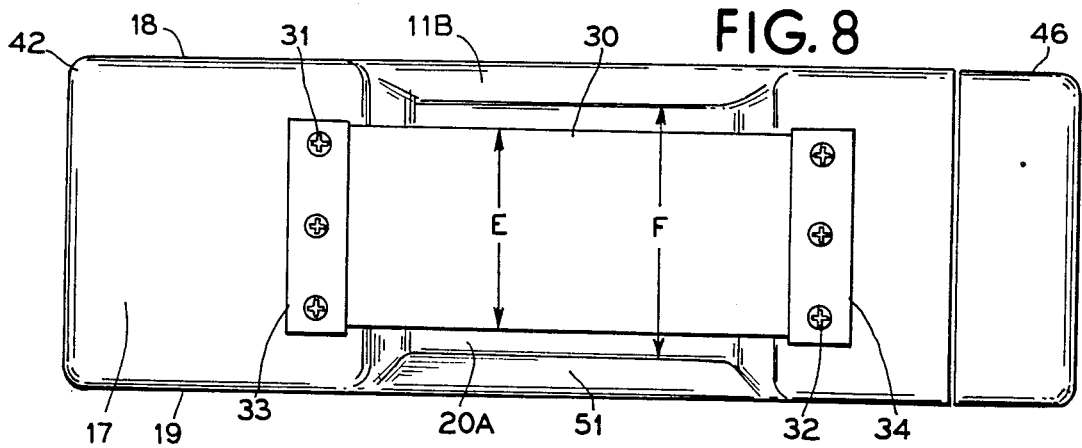
FIG. 8 is a somewhat diagrammatic bottom plan view of the terminal unit.
Figure 9:
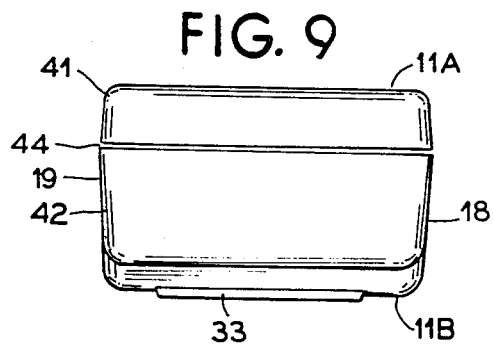
FIGS. 9 and 10 are end views showing the respective exterior ends of the terminal unit.

In FIG. 7, the length dimension D of the strap 30 between its end pieces 33 and 34 (FIG. 3) may preferably be about four and one-half inches, with a clearance gap dimension X of about ⅜ inch and a clearance gap dimension Y of about one-fourth inch. The dimension Z is at least about three inches, e.g. 3 ¼inches. In FIG. 8, dimension E may preferably be about two inches. In a specific presently preferred embodiment, dimension X reached a maximum of about nine millimeters, and dimension Y was about six millimeters.

Referring to FIG. 4, the general location of strap 30 has been indicated at the left. Because of the illustrated twenty degree downward convergence of casing side walls such as 51 (as indicated by angle AR3), the width of the substantially flat undersurface 20A of the terminal casing, dimension F, may be about two and one-half inches (F/2=1.25 inches), so that the width of the strap, E, may be about eighty percent of dimension F (E/2=1 inch). The clearance gap for the fingers between underside 11B and the strap 30 at the grip-conforming region 20 is at least about six millimeters (i.e. at least about one-fourth inch) over the longitudinal extent, dimension Z, FIG. 7, of this region.

In a preferred embodiment as shown in FIGS. 2-5, the casing is formed of main mating parts 41 and 42, FIG. 5, and a drawer part 43, FIG. 2. As shown in FIG. 5, parts 41 and 42 are interlocked by a tongue and groove type joint 44, and are secured together by fasteners such as 45, preferably in a watertight manner.

The drawer part 43 includes a battery drawer 43A, FIG. 4, which extends a substantial distance into the casing parts 41, 42 in its closed condition, e.g., about three and one-half inches, where the total length of part 43 is about four and one-half inches.

Figure 10:
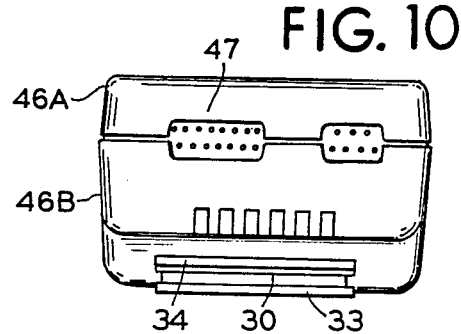
Figure 11:
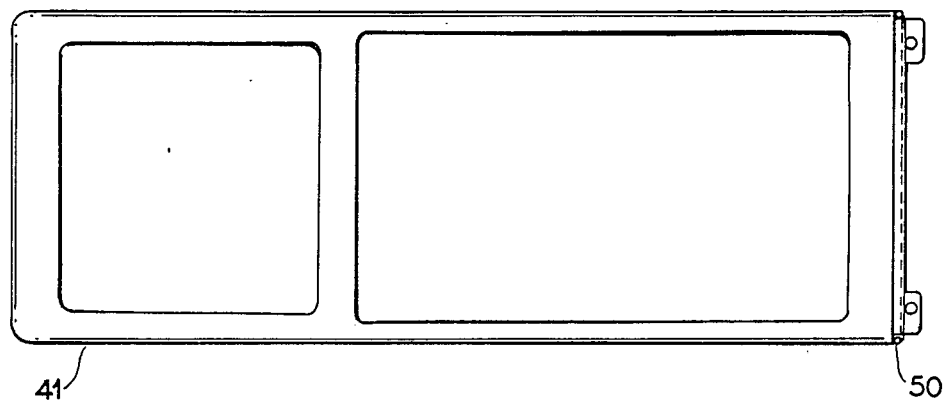
FIG. 11 is a top plan view of the main upper casing part (shown separately from the battery drawer part)

The drawer part 43 may have an end cap part 46, FIG. 7, formed of two mating parts 46A, 46B with notches defining rear apertures for receiving D subconnectors such as 47, FIG. 10. The parts 46A, 46B may include vertical guideways for slideably receiving a vertically inserted printed circuit board.

By way of example, the drawer 43A of the part 43 may have an interior space to receive and be substantially filled by six 1.2 volt, 750 milliampere hour nickel cadmium rechargeable cells in side by side relationship.

An O-ring 50 (FIGS. 11-14) is present in a groove 51, FIG. 2, between the main casing parts 41 and 42, and the battery drawer part 43, so as to seal off the interior of the casing, preferably making the terminal waterproof and capable of floating, while also providing a terminal which is dust proof and submersible.

A depressible grommet 61 is indicated in FIG. 3 and is depressible to unlatch the battery drawer part 43 for complete removal from its receiving opening in main casing part 42.

By way of example, the casing parts 41, 42 and 43 may be of aluminum or magnesium, and may be sealed so that the terminal unit in its preferred dimensions will float in water, weighing less than two pounds (without antenna 16). An antenna may weigh about two ounces to provide a total weight of about thirty ounces, for example. The strap 30 including end pieces 33 and 34, FIG. 3, may weigh about thirty grams, and may be resilient so as to accommodate larger size fingers and hands. The elasticity of strap 30 is such that, with the terminal 10 supported by a hand inserted between strap 30 and undersurface 20A, the terminal is held against the hand for a normal range of adult hand sizes with a comfortable degree of pressure, preferably such as to substantially resist the terminal slipping off the hand even when the hand is lowered into a vertical disposition, and the grip on configuration 20 substantially relaxed.

In a particular sample embodying the present invention, the strap had a thickness of about 1 ½millimeters and was formed of a composite fabric-like material composed of 79% nylon, 11% polyester and 10% rubber The material had the appearance of six wide and relatively thick side-by-side bands linked at narrow and thin connecting portions about one millimeter wide. The strap was slightly pre-loaded, e.g., stretched about ten percent, as mounted by fastener sets 31 and 32.

Figure 12:
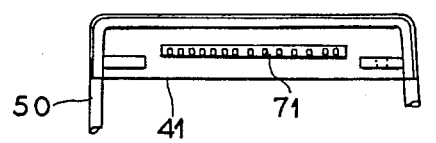
FIG. 12 is an end view of the main upper casing part of FIG. 11, looking into the opening which receives the battery drawer.
Figure 13:
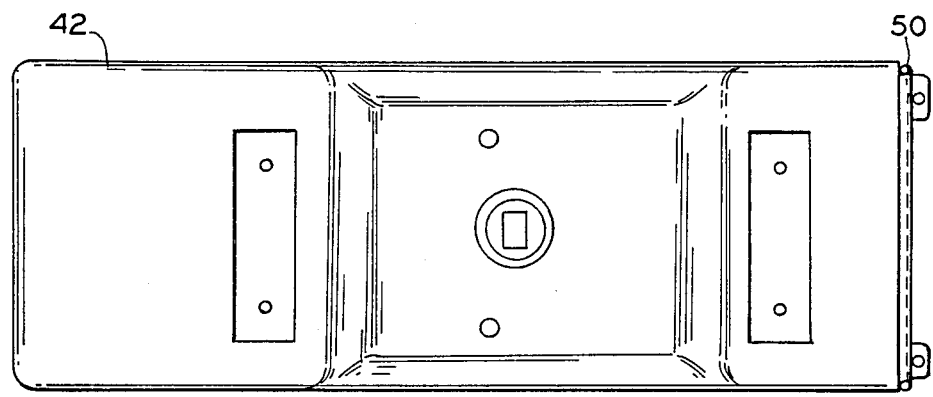
FIG. 13 is a bottom plan view of the main lower casing part showing the casing undersurface which mounts the strap end pieces, and showing an aperture for receiving a depressible grommet which is to be located beneath the strap and which is depressed to release the battery drawer part.
Figure 14:
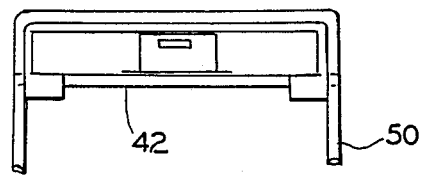
FIG. 14 is an end view of the casing part of FIG. 13 (showing the battery drawer receiving end in an inverted orientation).

As shown in FIG. 12, the upper casing part 41 at its end receiving the battery part 43, has an elongated aperture with a connector 71 providing holes for receiving twenty pins of a header carried by section 46A of the drawer end cap, as the drawer part 43 is fully assembled with the main casing parts 41 and 42. These pins may connect with suitable positions of the D-type connectors 47. The connectors 47 in turn may receive mating connectors from an auxiliary data input module, e.g., a bar code reader system such as described in the brochure of Norand Corporation identified herein in the section headed "BACKGROUND OF THE INVENTION".

SUMMARY DISCUSSION

In the preferred embodiment, the clearance gap 81, FIG. 7, between the strap 30 and undersurface 20A is of substantial size, e.g., as at X and Y, over a substantial longitudinal extent, e.g., as at Z, such that the fingers of one hand can be inserted between underside 11B, FIG. 8, and the strap 30 in a quick smooth insertion motion without requiring a lifting of the strap away from the underside of the terminal as a separate action).

A similar but less preferred result is obtained if the strap 30 is wider and overhangs the tapering sides 51, e.g. if the width of the belt is substantially greater than dimension F, FIG. 8.

Referring to FIG. 8, the underside 11B of the hand held computerized data collection terminal has a transverse extent between lower side walls 18 and 19 of at least about three inches at the opposite ends of the terminal. At the indentation 20, FIGS. 1 and 6, the bottom wall 20A defines an indentation bottom plane in relation to which the strap 30, FIG. 7, extends obliquely (since distances X and Y in FIG. 7 differ). The longitudinal extent of the indentation as shown by dimension Z, FIG. 7, is at least about three inches.

It will be apparent that various modifications and variations may be effected without departing from the scope of the teachings and concepts of the present invention.

We claim as our invention:

1. In a data collection system, a hand-held computerized data collection terminal comprising a terminal casing for housing operating circuitry and having first and second opposite ends along a longitudinal axis of the data collection terminal, and having a frontal side for data entry, said terminal casing itself having a bottom wall which is itself part of the terminal casing for housing the operating circuitry, said bottom wall itself having an exterior providing an underside of the terminal casing which is opposite said frontal side, said casing itself having side walls extending longitudinally of the data collection terminal between said frontal side and said bottom wall of said terminal casing, said bottom wall itself being indented at a portion of the terminal casing intermediate said first and second opposite ends to provide a grip-conforming configuration at the underside of the terminal casing, said bottom wall itself providing downwardly protruding shoulder portions having rounded edges with said indented intermediate bottom wall portion and at said first and second opposite ends of the data collection terminal adjacent the grip-conforming configuration which is to be gripped by one hand to tend to prevent slippage of the terminal casing in either longitudinal direction during gripping support thereof.

2. In a data collection system according to claim 1, said bottom wall at the grip-conforming configuration being offset by a substantial amount relative to the bottom wall at said downwardly protruding shoulder portions over a longitudinal extent of the grip-conforming configuration of at least about three inches.

3. In a data collection system according to claim 1, said side walls themselves being indented to further define lateral shoulders at said first and second opposite ends of the data collection terminal adjacent said grip-conforming configuration, and such that said shoulder portions protrude laterally as well as downwardly at the first and second opposite ends of said grip-conforming configuration.

4. In a data collection system according to claim 3, the bottom and side walls being indented at the grip-conforming configuration by a substantial amount, over a longitudinal extent of at least about three inches.

5. In a data collection system according to claim 3, said shoulder portion adjacent said first end of said first and second opposite ends protruding downward by a greater margin than said shoulder portion adjacent said second end.

6. In a data collection system according to claim 5, said terminal casing having strap means secured at said underside so as to extend longitudinally across the grip-conforming configuration between said shoulder portions, said strap means having a substantial spacing from the underside of the bottom wall of the terminal casing at the grip-conforming configuration over a longitudinal extent of the grip-conforming configuration of at least about three inches.

7. In a data collection system according to claim 3, said indented side walls being defined by side wall portions tapering inward at a substantial angle from said frontal side toward said bottom wall within said intermediate portion rendering said indented bottom wall of a width less than the width of the data collection terminal, said tapering side wall portions forming rounded edges with said shoulder portions and said bottom wall within said intermediate portion.

8. In a data collection system according to claim 7, said terminal casing having strap means secured at said underside adjacent said shoulder portions, said strap means extending longitudinally across the grip-conforming configuration between said shoulder portions.

9. In a data collection system according to claim 1, said terminal casing having strap means secured at said underside so as to extend longitudinally across the grip-conforming configuration between said shoulder portions.

10. In a data collection system according to claim 9, said frontal side having manually actuated data input means overlying said grip-conforming configuration.

11. In a data collection system according to claim 9, said strap means being spaced from the underside of said bottom wall to define a finger receiving gap of substantial size over a substantial finger-receiving longitudinal extent of said grip-conforming configuration.

12. In a data collection system according to claim 9, said strap means extending obliquely relative to said underside of said bottom wall at said grip-conforming configuration so as to define a finger receiving gap which tapers somewhat from a first margin of the grip-conforming configuration to a second margin of the grip-conforming configuration which is longitudinally opposite the first margin.

13. In a data collection system according to claim 12, said strap means having a difference in spacing from said underside at the first margin in comparison to its spacing at the second margin of about three millimeters.

14. In a data collection system according to claim 13, said grip-conforming configuration having a longitudinal extent between said first and second margins thereof of at least about three inches.

15. In a data collection system according to claim 12, said grip-conforming configuration having a longitudinal extent between said first and second margins thereof of at least about three inches.

16. In a data collection system,
a hand-held data collection terminal having a first end, and having a second end longitudinally opposite said first end,
said terminal having a first side with data display means for facilitating data collection operation, and having a second side opposite said first side, said second side having a substantial indentation integral therewith and intermediate the first and second ends for accommodating a hand of a user in supporting relation thereto such that the terminal is retained in the user's hand in a secure and comfortable manner,
resilient strap means extending generally longitudinally across said substantial indentation at said second side, said resilient strap means defining a finger receiving gap of substantial size over a substantial finger-receiving longitudinal extent of said indentation,
said substantial indentation having an indentation bottom wall lying generally in an indentation bottom plane, and forming part of said second side of said terminal, said resilient strap means being comprised of a generally flat strap extending obliquely in comparison to said indentation bottom plane so as to define a finger receiving gap between the resilient strap means and the indentation bottom wall which finger receiving gap tapers somewhat from a first margin relatively close to said first end to a second margin relatively close to said second end so as to provide a generally uniform gripping pressure of the strap on respective manual fingers of varying thickness in the finger receiving gap.

17. In a data collection system, a hand-held data collection terminal having a first end, and having a second end longitudinally opposite said first end, said terminal having a first side with data display means for facilitating data collection operation, and having a second side with a substantial indentation integral therewith and intermediate the first and second ends for accommodating a hand of a user in supporting relation thereto such that the terminal is retained in the user's hand in a secure and comfortable manner, resilient strap means extending generally longitudinally across said substantial indentation at said second side, said resilient strap means defining a finger receiving gap of substantial size and of at least about one-fourth inch over a substantial finger-receiving longitudinal extent of said indentation, said substantial indentation having an indentation bottom wall lying generally in an indentation bottom plane, and forming part of said second side, said resilient strap means being comprised of a generally flat strap extending obliquely in relation to said indentation bottom plane so as to define a finger receiving gap which tapers somewhat from a first margin relatively close to said first end to a second margin close to said second end so as to provide a generally uniform gripping pressure of the strap on respective manual fingers of varying thickness in the finger receiving gap.

* * * * *